United States Patent
Cornell et al.

(10) Patent No.: US 6,564,012 B2
(45) Date of Patent: May 13, 2003

(54) PHOTOGRAPHIC CAMERA HAVING LENS MOVEMENT CONTROL WITH PIVOTABLE GRIP SURFACES AND ADJACENT SHUTTER RELEASE

(75) Inventors: David J. Cornell, Caledonia, NY (US); Dennis R. Zander, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 34 days.

(21) Appl. No.: 09/949,497

(22) Filed: Sep. 7, 2001

(65) Prior Publication Data

US 2002/0054761 A1 May 9, 2002

Related U.S. Application Data

(63) Continuation-in-part of application No. 09/659,273, filed on Sep. 12, 2000.

(51) Int. Cl.[7] .................................................. G03B 3/10
(52) U.S. Cl. ...................... 396/85; 396/131; 348/240.3; 348/345
(58) Field of Search .................... 396/85–87, 131; 348/240.3, 240.99, 357, 345

(56) References Cited

U.S. PATENT DOCUMENTS

| | | | |
|---|---|---|---|
| 3,631,786 A | 1/1972 | Crapsey, Jr. ................. | 396/88 |
| 3,908,945 A | 9/1975 | Shapiro et al. ............. | 248/165 |
| 4,163,613 A | 8/1979 | Smart .......................... | 396/144 |
| 4,168,897 A | 9/1979 | Gates .......................... | 396/25 |
| 4,445,757 A * | 5/1984 | Enomoto et al. ......... | 396/86 X |
| 4,905,031 A | 2/1990 | Mody .......................... | 396/133 |
| 5,210,558 A | 5/1993 | Kobayshi et al. ............. | 396/86 |
| 5,313,238 A | 5/1994 | Kelley ......................... | 396/144 |
| 5,428,418 A | 6/1995 | Inaba .......................... | 396/85 |
| 6,018,632 A | 1/2000 | Takamura .................... | 396/85 |

* cited by examiner

*Primary Examiner*—W. B. Perkey
(74) *Attorney, Agent, or Firm*—Robert Luke Walker

(57) ABSTRACT

A camera has a main module and a lens movement control. The lens movement control has opposed front and rear grip surfaces that are disposed adjacent respective front and rear faces of the main module. The grip surfaces are pivotable relative to the main module from a neutral position to opposed first and second pivoted positions. A lens system is joined to the main module. The lens system has a driver and a movable lens element connected to the driver. The driver extends and retracts the movable lens element, relative to the main module, during the pivoting of the lens movement control to the first and second pivoted positions, respectively.

34 Claims, 17 Drawing Sheets

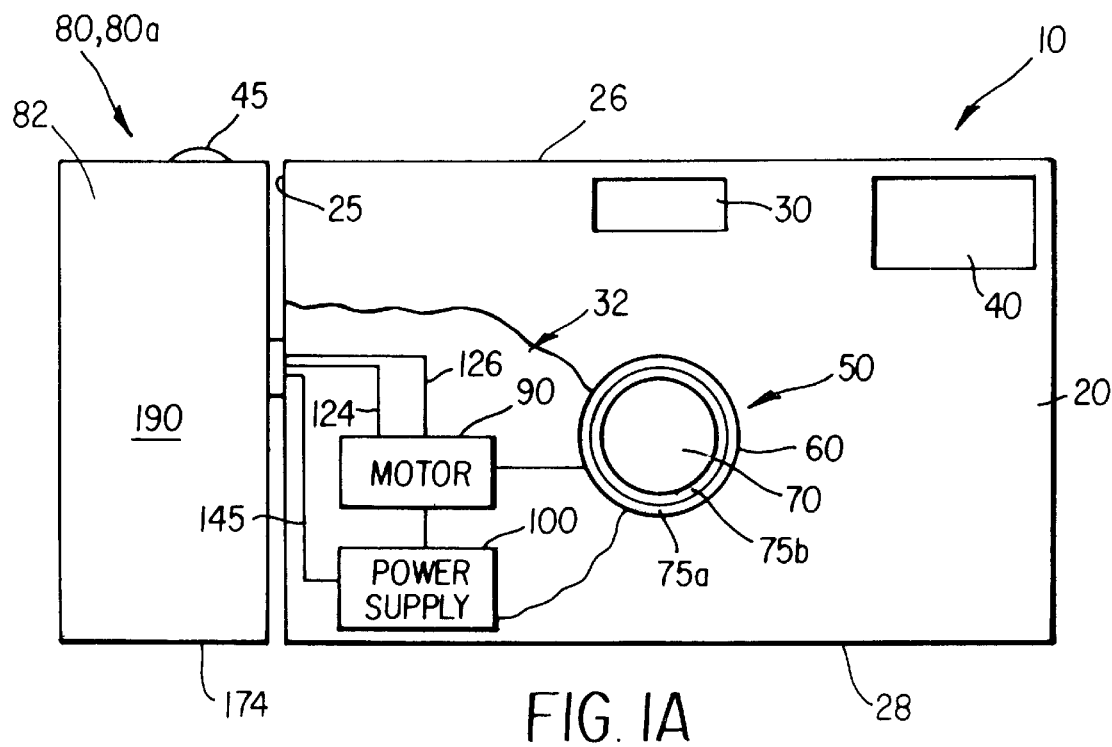
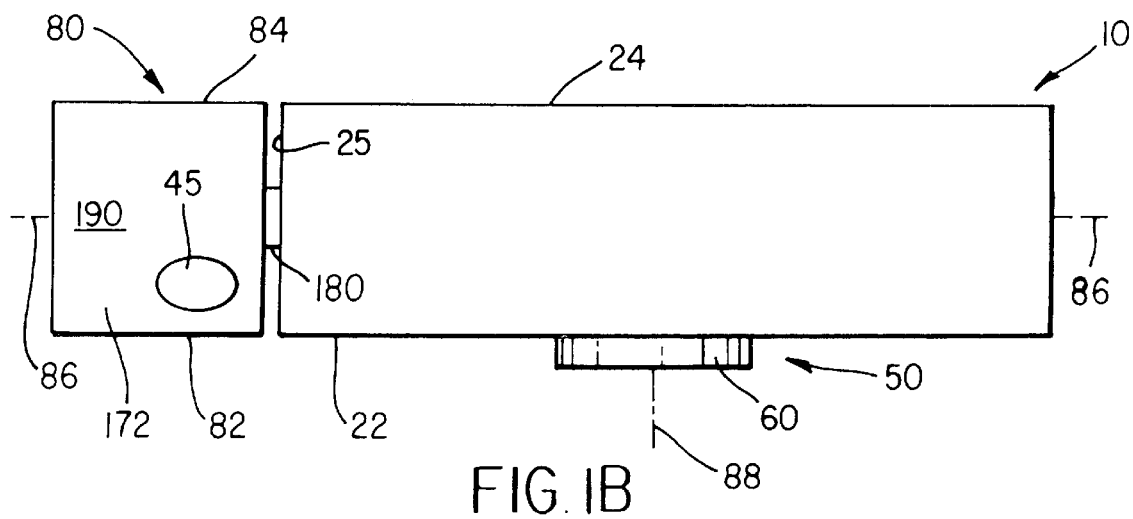

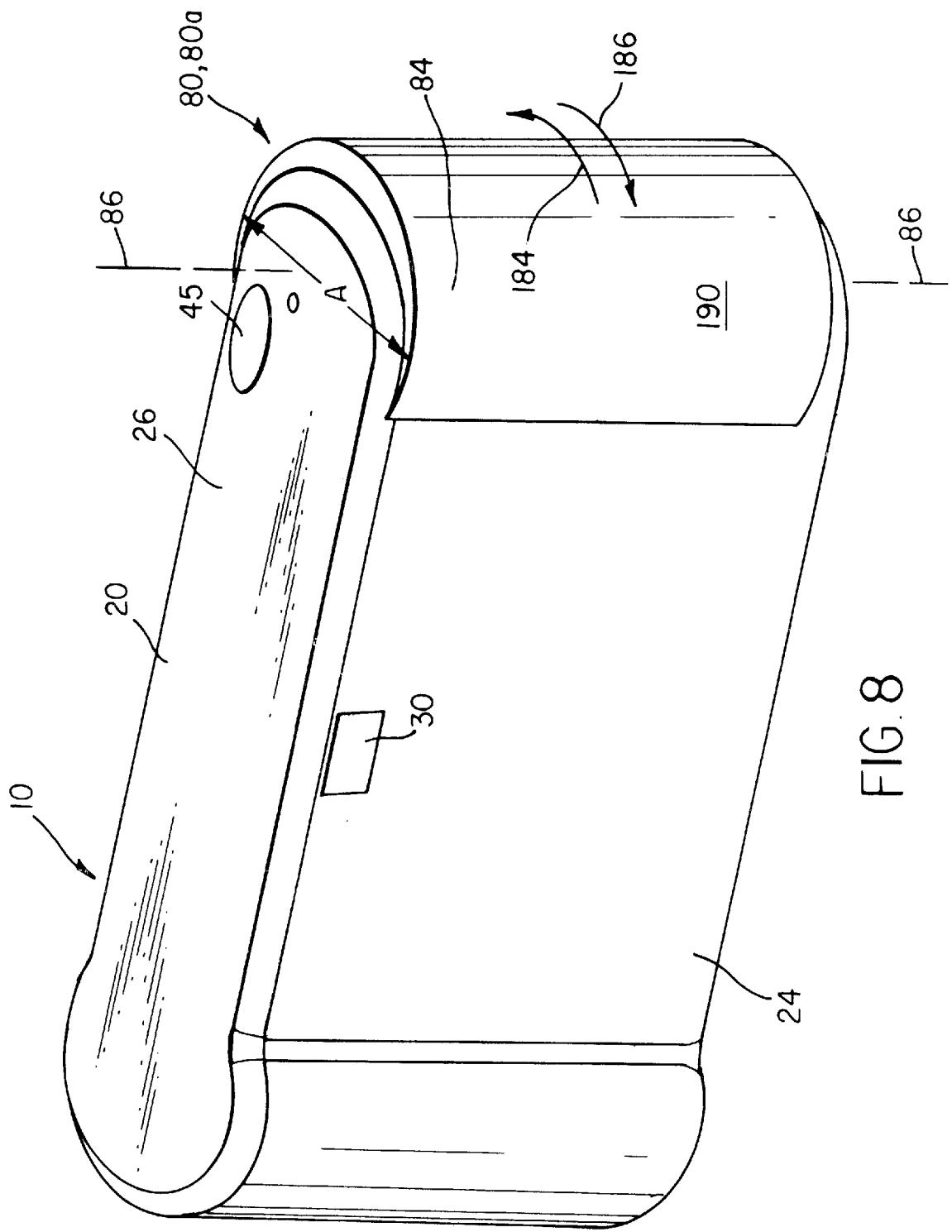

PHOTOGRAPHIC CAMERA HAVING LENS MOVEMENT CONTROL WITH PIVOTABLE GRIP SURFACES AND ADJACENT SHUTTER RELEASE

CROSS REFERENCE TO RELATED APPLICATIONS

This is a continuation-in-part of application Ser. No. 09/659,273, entitled: PHOTOGRAPHIC CAMERA HAVING PIVOTABLE FOCUS CONTROL AND METHOD OF ASSEMBLING THE CAMERA, filed Sep. 12, 2000, in the name of David J. Cornell.

FIELD OF THE INVENTION

The invention relates to photography and photographic cameras and more particularly relates to a photographic camera having a lens movement control with pivotable grip surfaces and adjacent shutter release.

BACKGROUND OF THE INVENTION

In many types of cameras, a lens system has one or more elements that are fixed in position relative to the camera body and one or more other elements that are movable, relative to the fixed element or elements, inward and outward relative to the camera body. The fixed element or elements are typically joined to a mount that is joined to or part of the camera body. The movable elements are typically held by a support that moves with them. Movement can be purely manual or can be provided via a powered or unpowered driver. Some cameras use movement of the movable element or elements to provide focusing. Other cameras change focal length, that is, "zoom". Still other cameras provide both.

For example, photographic cameras having adjustable telescoping lens barrels for focusing an image of a subject onto a photosensitive medium disposed in the camera are known. Such cameras allow the user to move the lens barrel outwardly and inwardly by means of a focus mechanism to adjust focus of the image while the image is viewed by the user through a view-finder. When the user arrives at a desired focus, the user then activates a shutter control for exposing the photosensitive medium to the focused image in order to obtain the image on the photosensitive medium.

One such camera focus mechanism is disclosed in U.S. Pat. No. 4,163,613 titled "Camera Focus Or Exposure Adjustment Mechanism" issued Aug. 7, 1979 in the name of David C. Smart and assigned to the assignee of the present invention. The Smart patent discloses a camera body housing a rotatable pinion disposed in a fixed rack for translation along the rack as the pinion is rotated. A manipulatable portion of the pinion exteriorly projects through a slot in the camera body, enabling the pinion to be manually rotated. A slide member rotatably supports the pinion. A control element, adjustably movable for focusing, is operatively coupled to the slide member for movement by the slide member in response to manual rotation of the pinion. A visual indicator on the slide member is viewable through a window in the camera body for indicating the proper setting of the control element.

However, the Smart patent does not appear to allow the user to focus the camera and then activate a shutter member to expose the film while simultaneously maintaining his hand on the lens movement control. That is, the Smart device appears to require the user to focus the camera and then remove his hand from the lens movement control in order to activate the shutter. Thus, allowing the user to focus the camera and then activate the shutter member while simultaneously maintaining his hand on the lens movement control would have the advantage that the user could avoid having to focus the camera and then divert his attention from the subject being photographed to find and activate the shutter member on the camera.

It would thus be desirable to provide an improved photographic camera which would allow the user of the camera to trip a shutter to expose the film while simultaneously maintaining his or her hand on a user control for moving a lens element.

SUMMARY OF THE INVENTION

The invention is defined by the claims. The invention, in its broader aspects, provides a camera that has a main module and a lens movement control. The lens movement control has opposed front and rear grip surfaces that are disposed adjacent respective front and rear faces of the main module. The grip surfaces are pivotable relative to the main module from a neutral position to opposed first and second pivoted positions. A lens system is joined to the main module. The lens system has a driver and a movable lens element connected to the driver. The driver extends and retracts the movable lens element, relative to the main module, during the pivoting of the lens movement control to the first and second pivoted positions, respectively.

It is an advantageous effect of the invention that an improved photographic camera which would allow the user of the camera to trip a shutter to expose the film while simultaneously maintaining his or her hand on a user control for moving a lens element.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 1A is a front view in partial elevation of a first embodiment of the photographic camera, with parts removed for clarity.

FIG. 1B is a plan view of the camera of FIG. 1A.

FIG. 8 is a rear perspective view of a fourth embodiment photographic camera, with parts removed for clarity.

DETAILED DESCRIPTION OF THE INVENTION

Figure 2A:
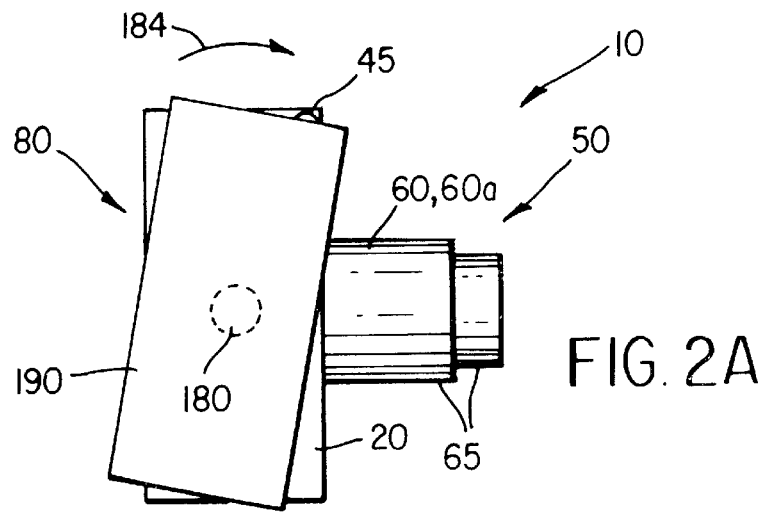
FIG. 2A is a side view of the camera of FIG. 1A showing the control module pivoted to a first position.
Figure 2B:
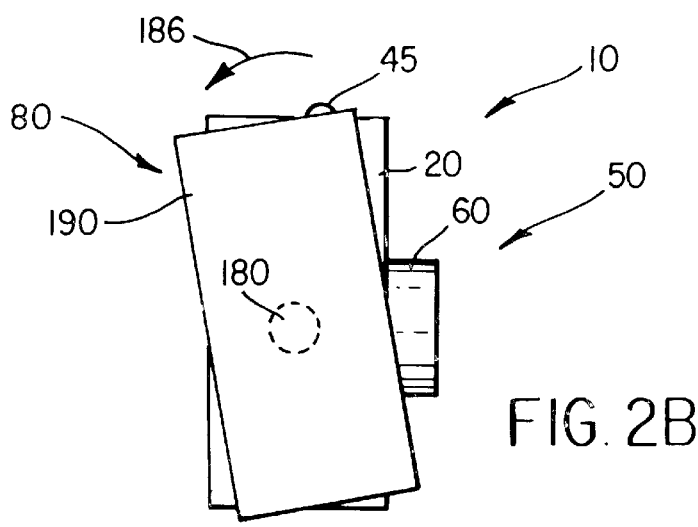
FIG. 2B is the same view as FIG. 2A, but showing the control module pivoted to a second position.

The present description will be directed in particular to elements forming part of, or cooperating more directly with, apparatus in accordance with the present invention. It is to be understood that elements not specifically shown or described may take various forms well known to those skilled in the art.

Therefore, referring to FIGS. 1A and 1B, there is shown a first embodiment photographic camera 10. Camera 10 has a body or main module 20 having opposed front and rear faces 22, 24 and opposed top and bottom faces 26, 28. Camera 10 includes a conventional view-finder 30, an electronic flash unit 40 and a shutter activation button or shutter release 45. The camera has an optical unit 32 that includes a lens assembly 50 that is mounted to the body or main module 20 and a driver 90. The lens assembly 50 focuses an image on photosensitive film media (not shown) disposed in main module 20. Alternatively, the lens assembly focuses the image on an electronic image sensor for image capture (also not shown) or the camera is a film-electronic hybrid and allows for film and electronic image capture.

Lens assembly 50 has immobile mount portion 52 and a movable lens unit 60, including at least one movable lens element 70. The movable lens unit is movable coupled to the mount portion 52. Lens element 70 is moved, along with the rest of the movable lens unit, by a driver 90, to zoom or focus the image.

In digital embodiments, the optical unit 32 can provide digital zoom, that is, digitally change the effective focal length of the lens assembly, instead of or in addition to optical zoom. In that case, the optical unit 32 has a signal processor (not shown) that provides the same zoom function as the movable lens unit 60 and driver 90. Examples of useful digital zoom methods and apparatus are disclosed in U.S. Pat. No. 5,172,234, which is hereby incorporated herein by reference. Optical and digital zoom can be used in combination with optical zoom acting between a first focal length and a second focal length and digital zoom acting between the second focal length and a third focal length.

The lens movement control 80 has opposed front and rear grip surfaces 82, 84 that are located adjacent the front and rear faces 22, 24 of the main module 20, respectively. The photographer's hand contacts one or both grip surfaces 82, 84 during camera use. The photographer moves the contacted grip surface of surfaces 82, 84 to focus or zoom the lens system of the camera. In moving, grip surfaces 82, 84 pivot about a pivot axis 86. In the embodiment of the camera shown in FIG. 1B, the pivot axis is parallel to or coextensive with a longitudinal axis of the camera and perpendicular to an imaginary line parallel to an optical axis 88 defined by the lens system 60. In an embodiment shown in FIG. 8, the pivot axis of the grip surfaces is perpendicular to the longitudinal axis of the camera and perpendicular to an imaginary line parallel to the optical axis. The pivot axis can be positioned and oriented in other ways, but those shown are currently considered most convenient for the user of the camera.

The grip surfaces 82, 84 of the lens movement control 80 are coupled to pivot detectors 72, 74, which detect pivoting of the grip surfaces 82, 84. In most of the embodiments disclosed herein, the grip surfaces 82, 84 pivot together as a single unit. In those embodiments, a first pivot detector detects pivoting in a first direction and the second pivot detector detects pivoting in a second direction opposite the first direction. For example, the first direction can be clockwise and the second counter-clockwise. A variety of different kinds of devices can be used for this purpose. For example, pivoting can be detected optically, or by movement of mechanical parts, or by directly changing a setting of a variable electronic component such as a variable resistor or capacitor. Each pivot detector is capable of signaling, at the least, that the lens movement control has or has not been pivoted in the respective direction. Pivot detectors 82, 84 can be completely independent of each other or, as in the switch described below, can share one or more parts with each other.

The lens movement control 80 and the shutter release 45 are preferably at the same end or side portion 25 of the camera. It is more preferred that the shutter release 45 is disposed adjacent to top face 26 of the main module in alignment with the front and rear grip surfaces 82, 84. This allows the user to focus or zoom the camera and then activate a shutter member to expose the film while simultaneously maintaining his or her hand on the lens movement control. The shutter release 45 can be mounted on the lens movement control 80 or on the main module 20.

In some of the embodiments disclosed herein, including the embodiment of the invention shown in FIGS. 1A–1B, the lens movement control 80 is a control module 80a that is externally articulated to the main module 20 by an axle 180. A gap between the two modules can be exposed as or can be covered (not illustrated). The control module 80*a* houses one or more additional user controls, such as the shutter release 45, or acts as a grip for the camera 10 or both. Camera components are located in the main module or control module as discussed herein or otherwise as convenient. In the embodiments shown in FIGS. 1A–10, the front and rear grip surfaces 82, 84 are continuous with and undifferentiated from the rest of the outside of the control module 80*a*; however, surface relief or knurling (not shown) or the like can be provided to help guide to user to convenient hand placement and to provide a non-slip surface. The outside of the control module also provides additional grip surfaces, such as top and bottom grip surfaces 172, 174 adjacent the top and bottom faces 26, 28, respectively of the main module 20. Such additional grip surfaces can be provided, but are optional and can be eliminated or minimized, as desired.
(Compare FIGS. 1B and 6B)

In the following discussion, some embodiments use the movable lens unit 60 for focusing and others for zoom control. In each embodiment the other function, zooming or focusing, can be provided in the same manner. In embodiments that use the lens movement control for zooming, focusing can be automatic or manual, but is not provided by the same manipulations of the lens movement control used to provide zooming. A wide variety of suitable focusing methods and apparatus for zoom cameras are well known to those of skill in the art.

In particular embodiments now described, the lens movement control numeral 80 is used for focusing. The lens assembly 50 includes a lens barrel 60*a* as the movable lens unit that is moved by the lens movement control 80 for focusing. The lens barrel 60*a* houses lens element 70. Lens barrel 60*a* may be a conventional telescoping lens barrel having a plurality of concentrically arranged sections 65 variably movable outwardly and inwardly with respect to camera body 20.

Referring to FIGS. 1A, 1B, 2A, 2B and 2C, the lens movement control 80 is coupled to lens barrel 60*a* for controllably moving lens barrel 60*a*. More specifically, lens movement control 80 comprises a variable speed reversible motor or drive 90 engaging lens barrel 60*a* for variably advancing lens barrel 60*a*, and thus lens 70, outwardly from camera body 20 and for variably retracting lens barrel 60*a*, and thus lens element 70, inwardly toward camera body 20 while energized by a power supply 100. The power supply 100 may be a suitable battery replaceably disposed in camera body 20. However, power supply 100 may be a source of electrical power disposed externally to camera body 20, if desired.

Referring to FIGS. 1A, 1B, 2A, 2B, 2C, 3A, 3B, and 3C, lens movement control 80 further includes a switch 130, adapted to advance and retract lens barrel 60*a*. Switch 130 has a first electrical contact 110 and a second electrical contact 120, each electrically connected to motor 90. First electrical contact 110 is electrically connected to motor 90 by a first conducting wire 124 and second electrical contact 120 is connected to motor 90 by a second conducting wire 126.

Switch 130 has a generally elongate and resilient spring member 140 connected to power supply 100, such as by third electrically conducting wire 145. Spring member 140 has a first end portion 150 bendable into engagement with first electrical contact 110 or second electrical contact 120 in a manner disclosed hereinbelow. Spring member 140 also has a second end portion 160 anchored to camera body 20, such as by means of a pair of side-by-side anchoring pins 170*a*/*b* arranged to clamp second end portion 160 therebetween. Spring member 140 also has a mid-portion thereof affixed to a rotatable shaft 180. In this manner, first end portion 150 of spring member 140 will pivot in a first direction 184 while shaft 180 is caused to rotate in first direction 184 and will pivot in a second direction 186 while shaft 180 is caused to rotate in second direction 186. Thus, when shaft 180 rotates in first direction 184, it will exert a pivoting force on spring member 140 to elastically bend or deform first end portion 150 of spring member 150 and to bring first end portion 150 into engagement with first electrical contact 110. Similarly, when shaft 180 rotates in second direction 186, it will exert a pivoting force on spring member 140 to elastically bend or deform first end portion 150 of spring member 140 and to bring first end portion 150 into engagement with second electrical contact 120. That is, spring member 140 is resilient or elastic having a predetermined spring constant. Thus, first end portion 150 of spring member 140 will disengage first electrical contact 110 and rebound to travel to an initial position intermediate first electrical contact 110 and second electrical contact 120 when shaft 180, to which spring member 140 is affixed, no longer exerts the pivoting force on spring member 140. Similarly, first end portion 150 of spring member 140 will disengage second electrical contact 120 and rebound to travel to the initial position intermediate first electrical contact 110 and second electrical contact 120 when shaft 180, to which spring member 140 is affixed, no longer exerts the pivoting force on spring member 140. This is so because, while first end portion 150 of spring member 140 pivots, second portion 160 of spring member 140 remains anchored between anchoring pins 170*a*/170*b* to produce a continuous biasing force on spring member 140. In this manner, first end portion 150 of elastic spring member 140 returns to its undeformed elongate shape between first electrical contact 110 and second electrical contact 120 when no longer acted upon by the previously mentioned pivoting force.

Still referring to FIGS. 1A, 1B, 2A, 2B, 2C, 3A, 3B, and 3C, when first end portion 150 of spring member 140 engages first electrical contact 110, a first electrical circuit is defined by spring member 140, first conducting wire 124, motor 90, third conducting wire 145 and power supply 100 for energizing motor 90, so that motor 90 advances lens barrel 60*a* to focus the image. Similarly, when first end portion 150 of spring member 140 engages second electrical contact 120, a second electrical circuit is defined by spring member 140, second conducting wire 126, motor 90, third conducting wire 145 and power supply 100 for energizing motor 90, so that motor 90 retracts lens barrel 60*a*. Advancing and retracting lens barrel 60*a* in this manner advances and retracts lens element 70 for focusing the image.

Figure 2C:
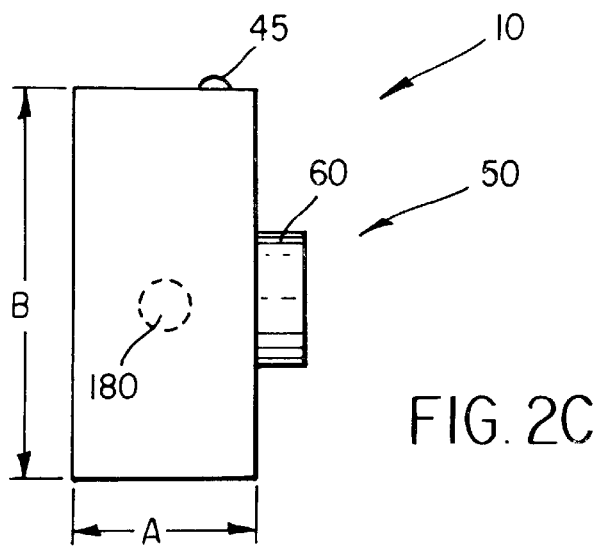
FIG. 2C is the same view as FIG. 2A, but showing the control module in a neutral position between the first and second positions.
Figure 3A:
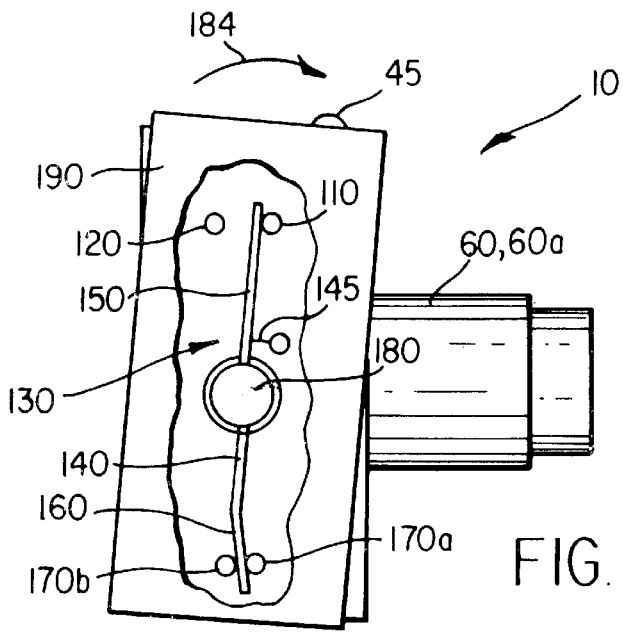
FIGS. 3A–3C are the same views as FIGS. 2A–2C, respectively, but with the control module shown partially cut away.
Figure 3B:
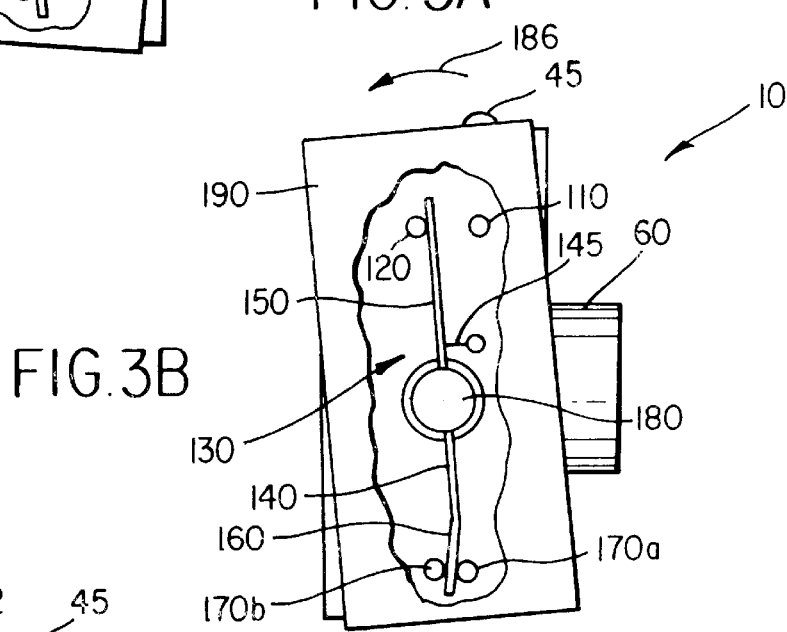
Figure 3C:
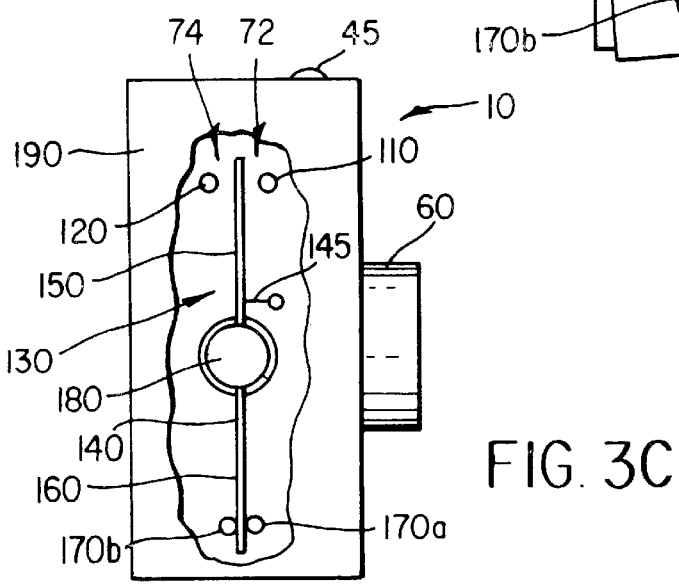

In the embodiments disclosed in FIGS. 1A–3C, the lens movement control 80 is a control module 80*a* that acts as a pivotable grip. The control module 80 has a handle or housing 190 joined to a shaft 180 for manually rotating shaft 180 in order to pivot first end portion 150 of spring member 140. The grip surfaces 82, 84 are part of the housing 190. A user of camera 10 manually exerts a pivoting force on handle 190 to pivot handle 190 from an initial neutral position, in which the handle is upright and aligned with the main module (as shown in FIGS. 2C and 3C). That is, handle 190 is capable of being pivoted by the user in the first direction 184 until first end portion 150 of spring member 140 is stopped from pivoting by engagement of first end portion 150 with first electrical contact 110. Handle 190 is also capable of being pivoted by the user in the second direction 186 until first end portion of spring member 140 is stopped from pivoting by engagement of first end portion 150 with second electrical contact 120. When first end portion 150 engages first electrical contact 110, motor 90 is energized so that lens barrel 60a will advance outward from camera body 20 and when first end portion 150 engages second electrical contact 120, motor 90 is again energized so that lens barrel 60a will retract inward toward camera body 20.

Lens barrel 60a is advanced and retracted in this manner to focus the image in camera body 20. When the user releases handle 190, the handle 190 will return to its initial position because of the resiliency of spring member 140 and because handle 190 is connected to spring member 140, as previously mentioned. Shutter activation button 45 is mounted on handle 190. Thus, the user of camera 10 can focus the image while simultaneously activating shutter activation button 45 without taking his hand from handle 190 because shutter activation button is mounted on or disposed adjacent to handle 190, which is gripped by the hand of the user.

Turning now to FIGS. 4A, 4B, 4C and 5, a second embodiment photographic camera 10, differs from the first embodiment in having a smaller handle 190a of lens movement control 80. This handle can be manipulated by only a few fingers of the user's hand rather than by the entirety of the user's hand.

Referring to FIGS. 6A, 6B, 7A, 7B and 7C, a third embodiment photographic camera 10 differs from the earlier embodiments in having a lens movement control 80 in which the pivotable handle 190b is generally parabolic-shaped and wraps substantially around the side portion 25 of camera body 20. This configuration of the handle assists in protecting shaft 180 from damage. In this case, the shutter release 45 is on the main module 20.

Referring to FIGS. 8, 9, 10 and 11, there is shown a fourth embodiment photographic camera 10 which differs from the earlier embodiments in that the lens movement control 80 has a roller-shaped handle 190c for engaging spring member 140. As handle 190c is pivoted by the user in a first rotation direction 184a to its fullest extent, it will close the first circuit to advance lens barrel 60a and as handle 190c is pivoted by the user in a second rotation direction 186a to its fullest extent, it will open the first circuit, and close the second circuit to retract lens barrel 60a. Configuration of spring member 140, first electrical contact 110, second electrical contact 120, anchoring pins 170a/b, and shaft 180 is the same as in the first embodiment of the invention, except that spring member 140, first electrical contact 110, second electrical contact 120, anchoring pins 170a/b, and shaft 180 are oriented in a horizontal plane with respect to camera body 20. In the first, second and third embodiments of the invention, spring member 140, first electrical contact 110, second electrical contact 120, anchoring pins 170a/b, and shaft 180 are oriented in a vertical plane with respect to camera body 20.

Figure 4A:
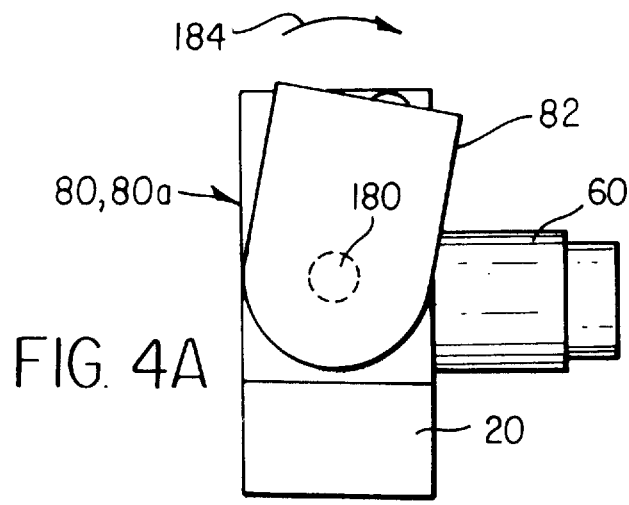
FIG. 4A is a side view of a second embodiment photographic camera, with parts removed for clarity, showing the lens movement control pivoted to a first position.
Figure 4B:
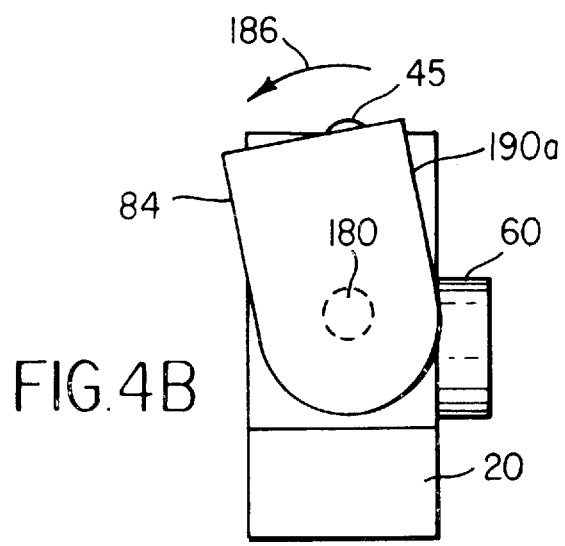
FIG. 4B is the same view as FIG. 4A, but the lens movement control is shown pivoted to a second position.
Figure 4C:
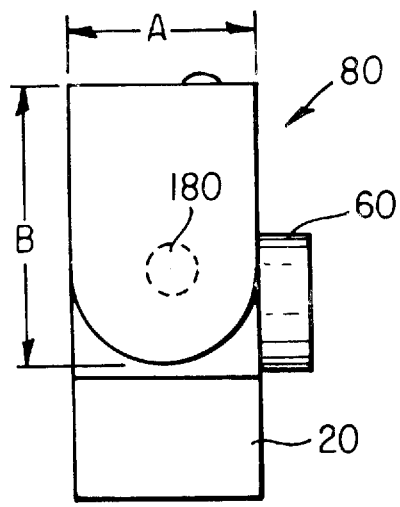
FIG. 4C is the same view as FIG. 4A, but the lens movement control is shown in a neutral position between the first position and the second position.
Figure 5:
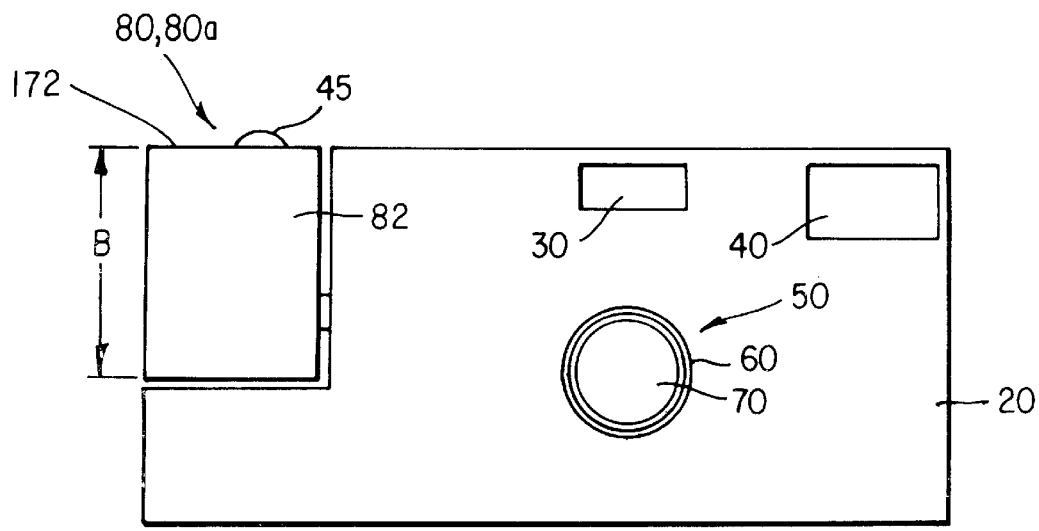
FIG. 5 is a front view of the camera of FIG. 4A.
Figure 6A:
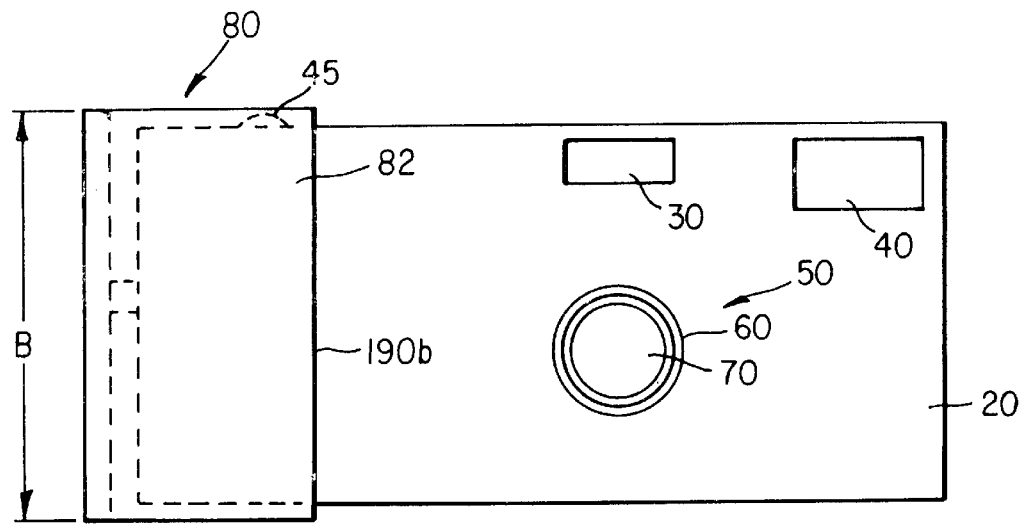
FIG. 6A is a front view of a third embodiment photographic camera, with parts removed for clarity.
Figure 6B:
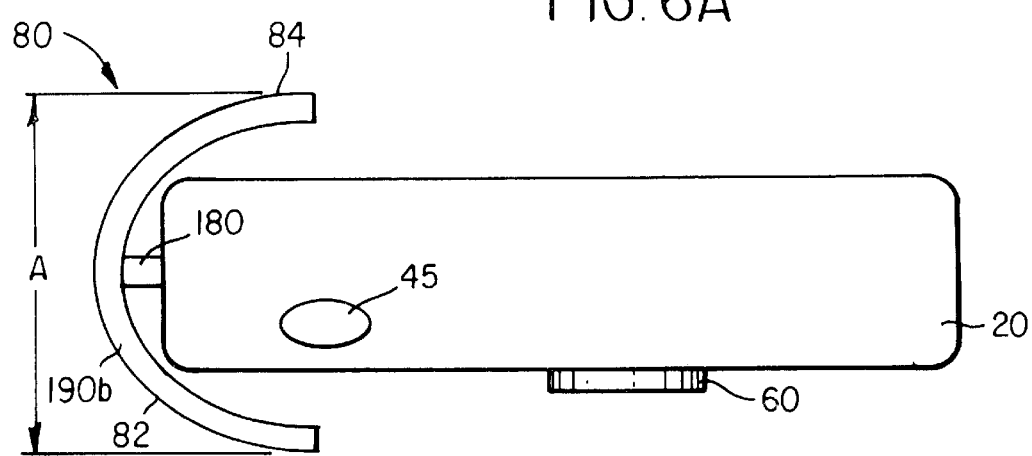
FIG. 6B is a top view of the camera of FIG. 6A.
Figure 7A:
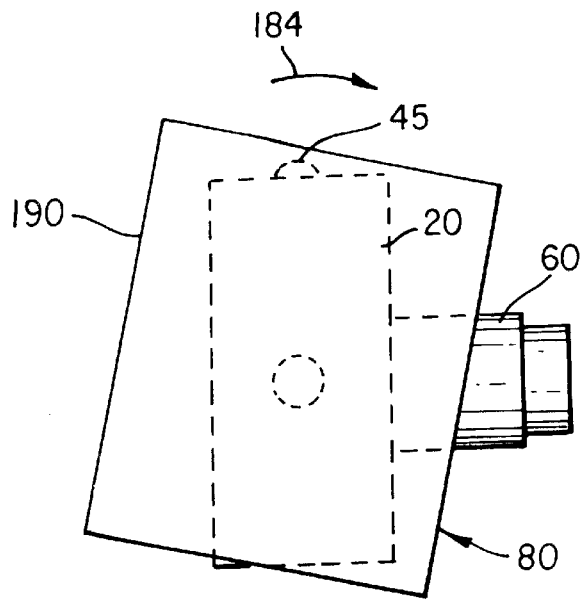
FIG. 7A is a side view of the camera of FIG. 6A, showing the lens movement control pivoted to a first position.
Figure 7B:
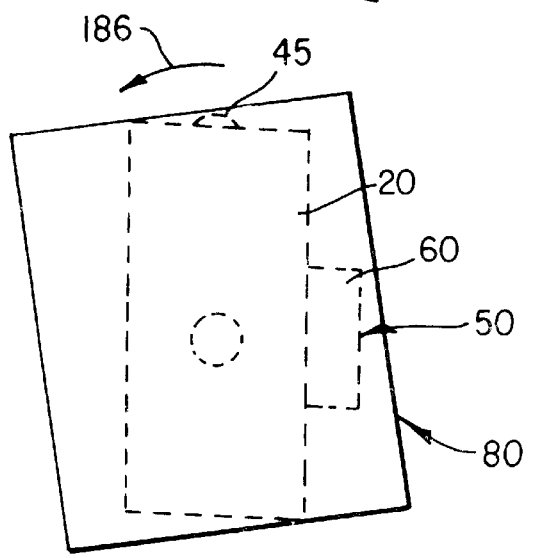
FIG. 7B is the same view as FIG. 7A, but with the lens movement control pivoted to a second position.
Figure 7C:
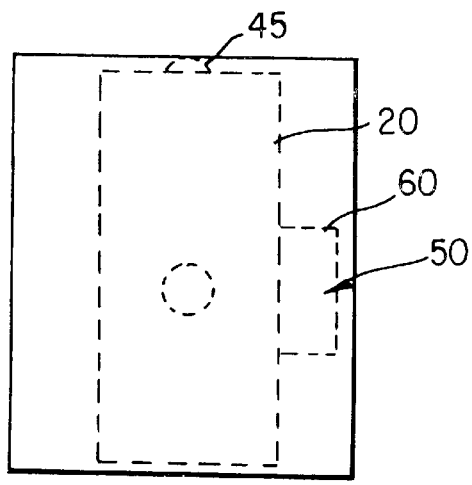
FIG. 7C is the same view as FIG. 7C, but with the lens movement control in a neutral position between the first position and the second position.
Figure 9:
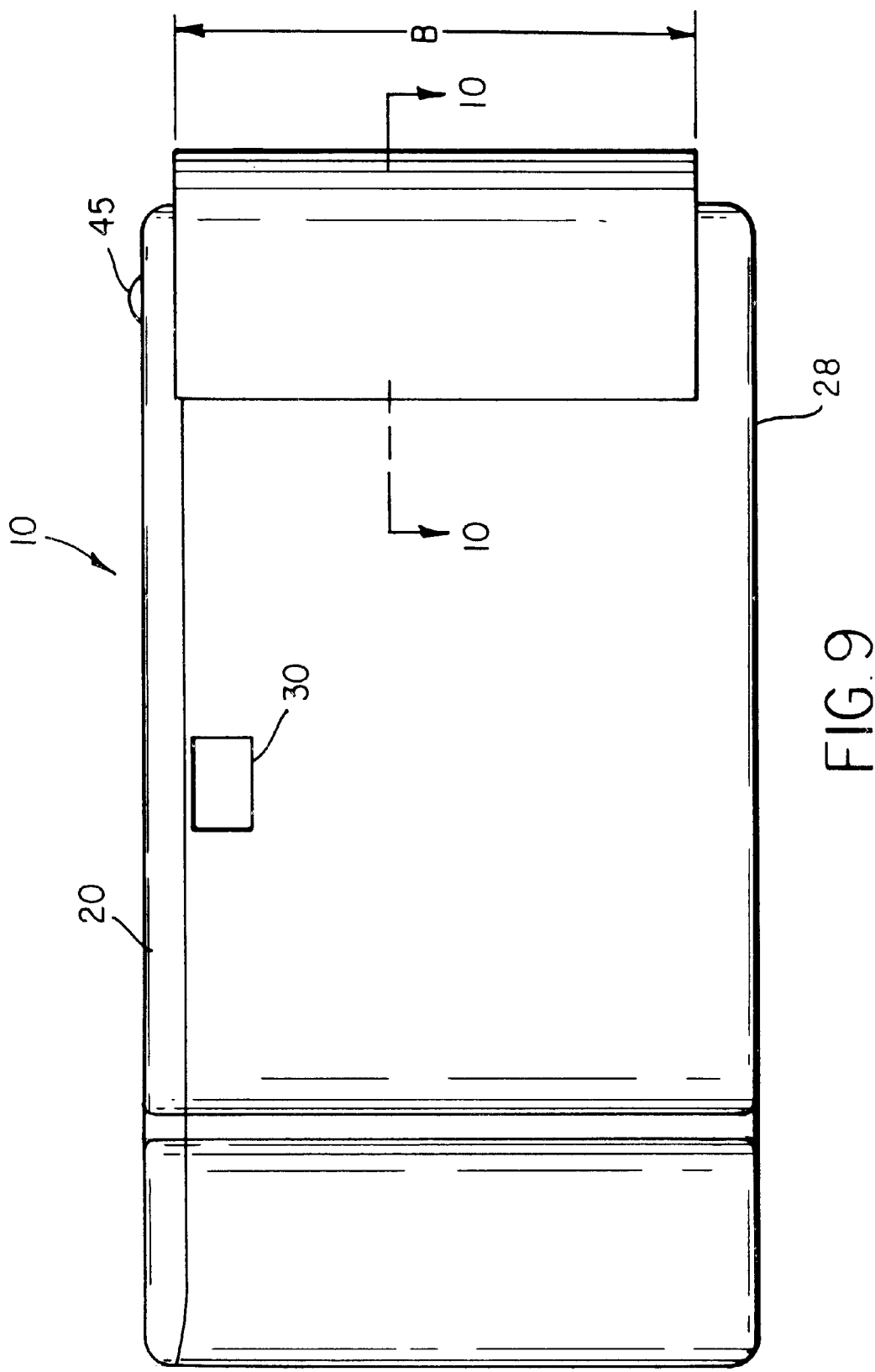
FIG. 9 is a rear view of the camera of FIG. 8.
Figure 10:
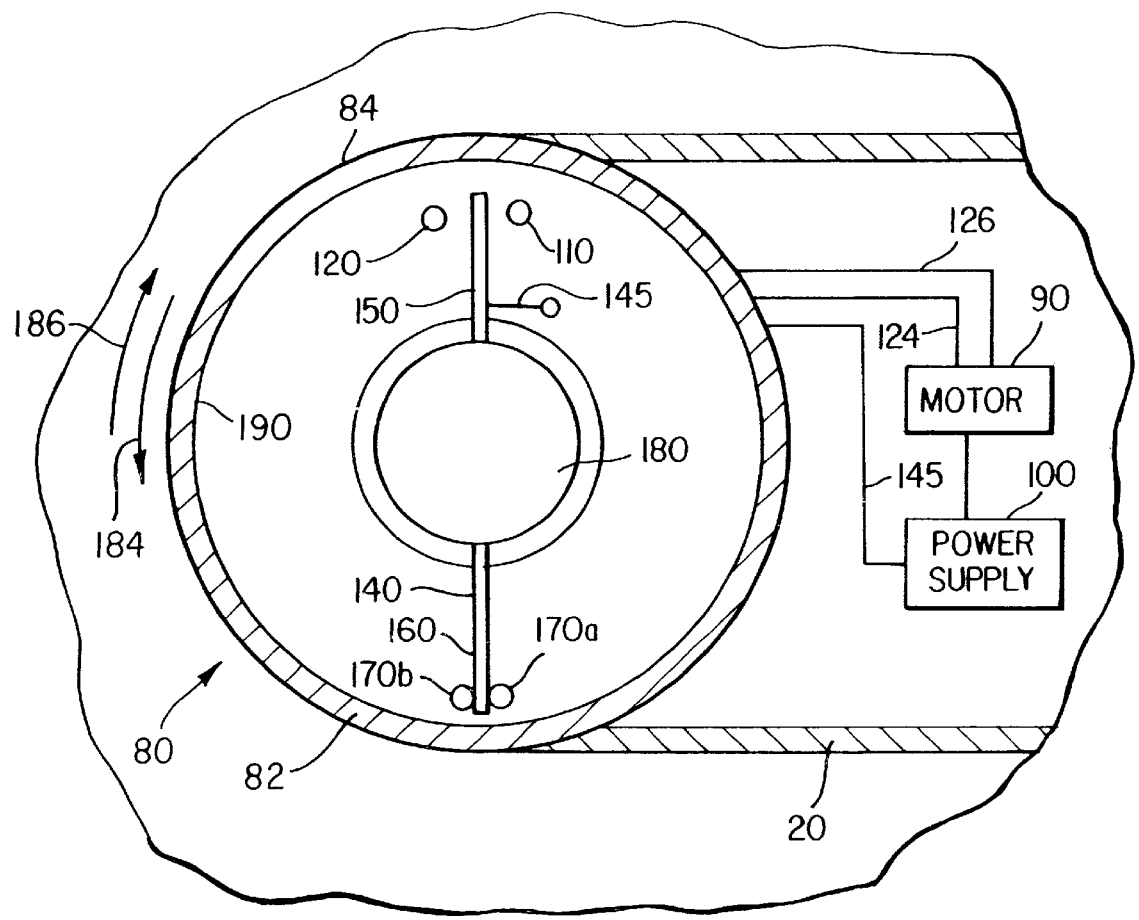
FIG. 10 is a partial, enlarged cross-sectional view of the camera of FIG. 8 taken along section line 10—10 of FIG. 9.

The control module has a first dimension (indicated in the figures by "A") that is perpendicular to the longitudinal axis and parallel to the optical axis. The control module has a second dimension (indicated in the figures by "B") that is perpendicular to the longitudinal axis and perpendicular to the first dimension. Referring to FIG. 2C, in a particular embodiment, the first and second dimensions are each the same size as a corresponding dimension of the body. Referring to FIGS. 4C and 5, in another embodiment, the first dimension is the same size as a corresponding dimension of the body and the second dimension is smaller than the corresponding dimension of the body. Referring to FIGS. 6A and 6B, in another embodiment, the first, and second dimensions are larger than corresponding dimensions of the body. Referring to FIGS. 8–9, in another embodiment, the second dimension is smaller than the corresponding dimension of the body and the first dimension is the same size. The choice of relationship between the first and second dimensions and the corresponding dimensions of the body depends upon whether the handle is intended to function as a grip for the camera. For that purpose, it is preferred that one or both of the dimensions of the handle are larger than or equal to corresponding dimensions of the body so that the handle is easily gripped. If the handle is intended to not function as a grip, then it is preferred that at least one of the first and second dimensions is smaller than a corresponding dimension of the body, since this makes it easier for the user to provide all or a large part of the support for the body and move the handle using the same hand.

In the embodiments shown in FIGS. 11–19, the lens movement control 80b has a yoke 192 that includes the grip surfaces 82, 84. The yoke 192 has a connecting portion 194 that joins together the grip surfaces 82, 84. The connecting portion 194 is located within the body 20. The grip surfaces 82, 84 are exposed through openings 196, 198 in the respective faces 22, 24 of the body 20. The yoke 192 is a unitary structure that pivots as a single piece. In the embodiments shown, the yoke 192 is one-piece of material and is, preferably, a polymeric casting.

The grip surfaces 82, 84 are positioned relative to the respective faces 22, 24 of the body 20 such that the lens movement control 80b can be easily adjusted during picture taking. In the embodiments shown, the grip surfaces 82, 84 are positioned such that the user can wrap a right hand around the end 25 of the body 20 and touch the rear grip surface 84 with a thumb, the front grip surface 82 with a finger, and have a forefinger positioned on the shutter release 45. The grip surfaces 82, 84 can be knurled or the like to prevent slippage.

Figure 11:
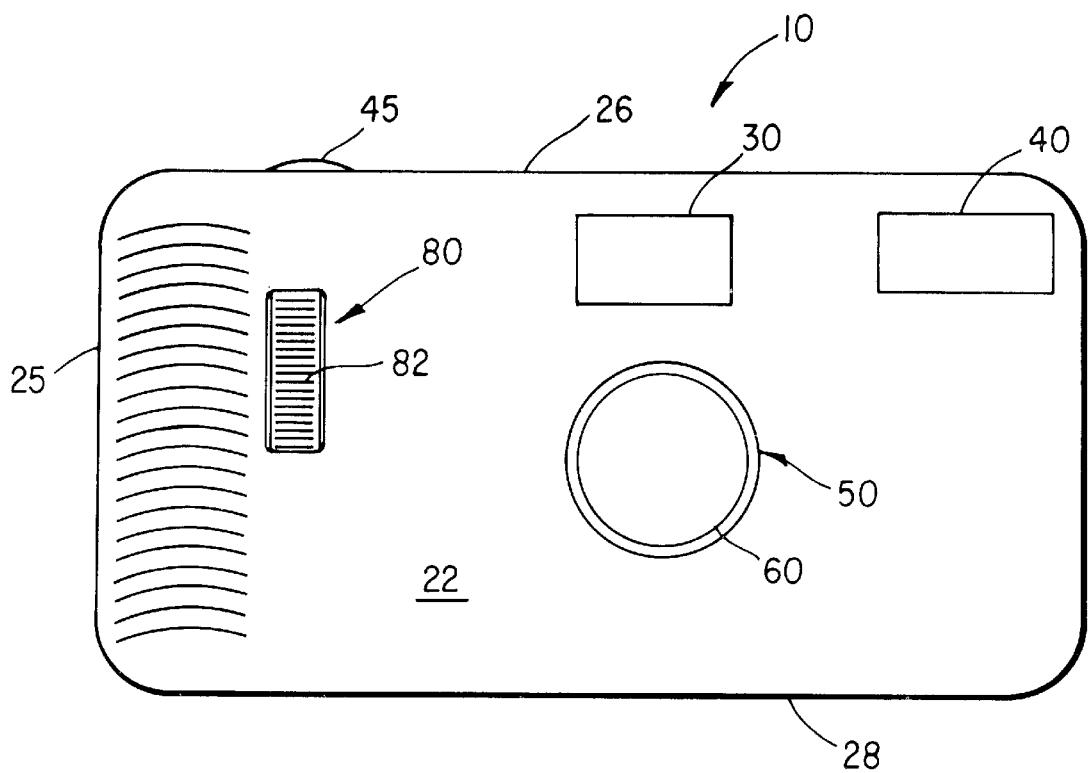
FIG. 11 is a front view of a fifth embodiment camera.
Figure 12:
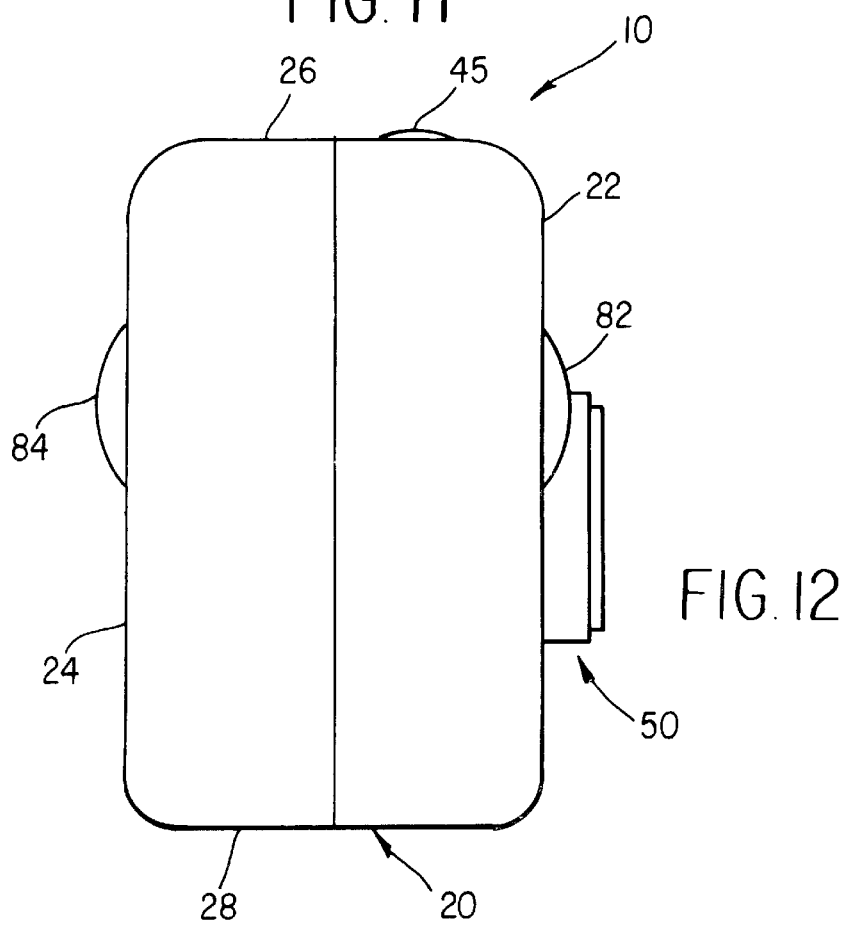
FIG. 12 is a side view of the camera of FIG. 11.

FIGS. 11–12 illustrate the external features of several different embodiments of the camera. In the embodiment illustrated by FIGS. 11–13, the lens movement control 80b has a yoke 192 in the form of a wheel mounted internal to the body. The yoke 192 pivots about pivot axis parallel to a longitudinal axis of the body 20. The yoke 192 has a continuous circular rim 200 and a strut 202 that extends diametrically across and joins the yoke 192 to the shaft 180. Cut-out areas 204 can be provided to accommodate pivot detectors 72, 74, such as the switch mechanism earlier described.

Figure 13:
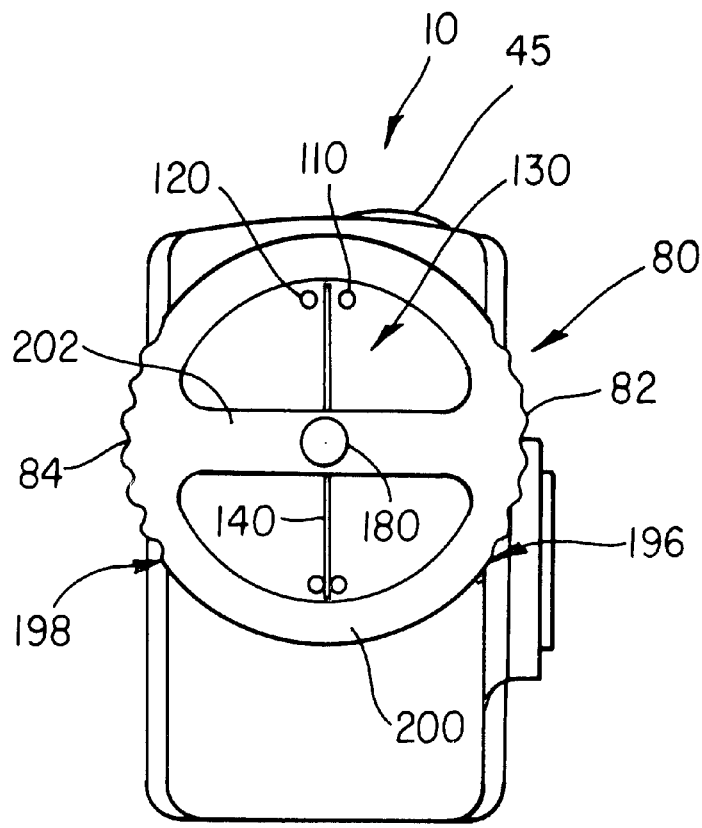
FIG. 13 is the same view as FIG. 12, but cutaway to show the lens movement control.
Figure 14:
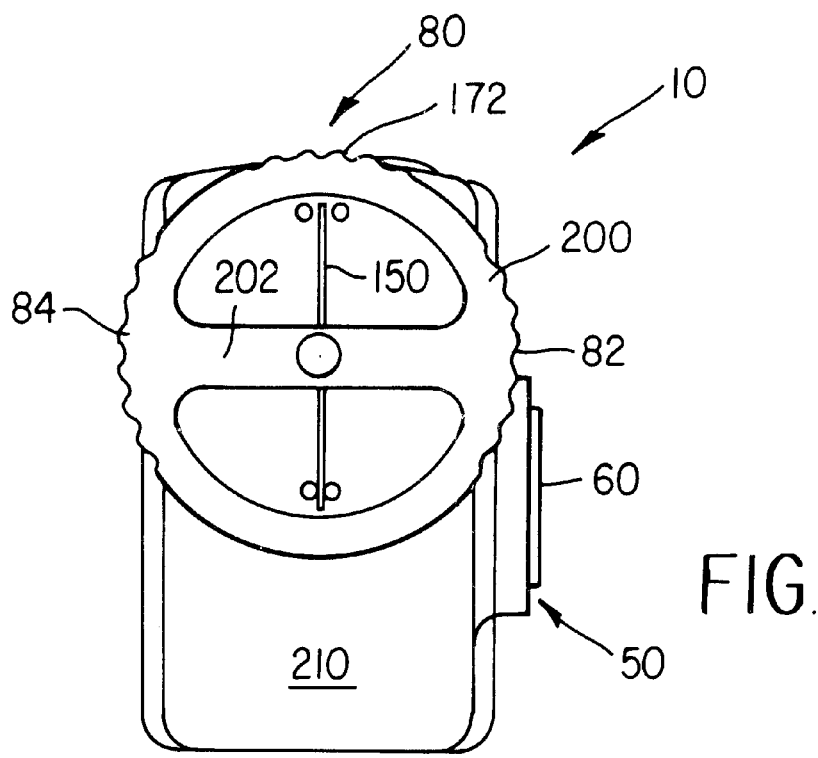
FIG. 14 is a side view of a modification of the camera of FIG. 12, cutaway to show the lens movement control.
Figure 15:
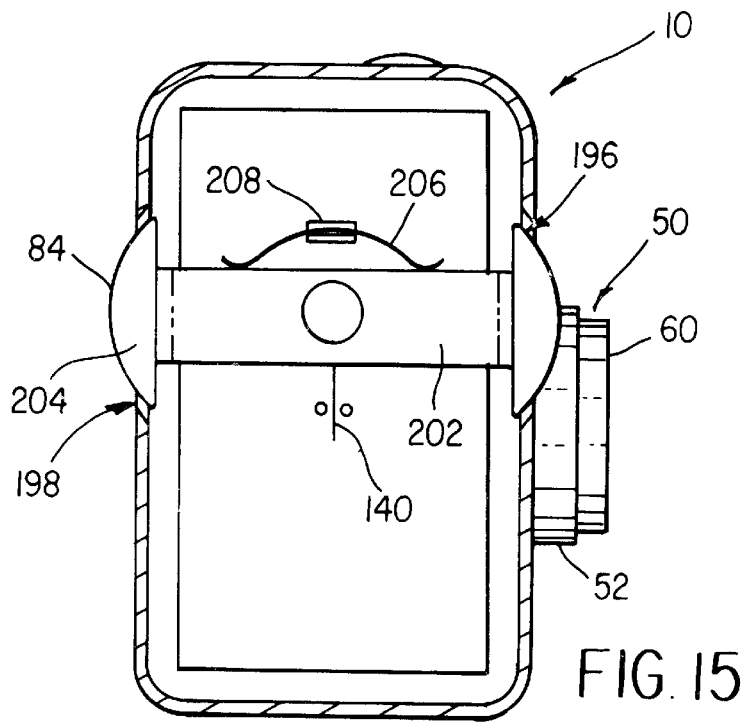
FIG. 15 is a side view of another modification of the camera of FIG. 12, cutaway to show the lens movement control. The lens movement control is shown in a neutral position.
Figure 16:
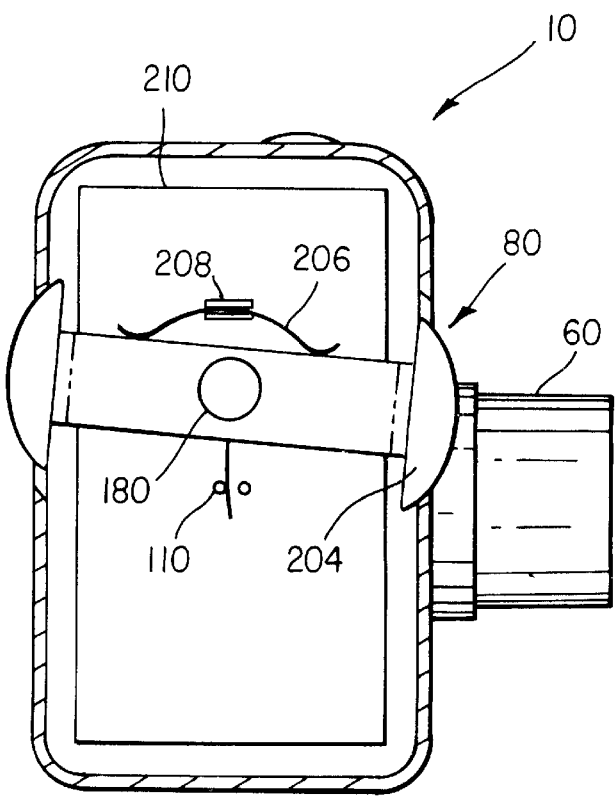
FIG. 16 is the same view as FIG. 15, but the lens movement control is in a first pivoted position.
Figure 17:
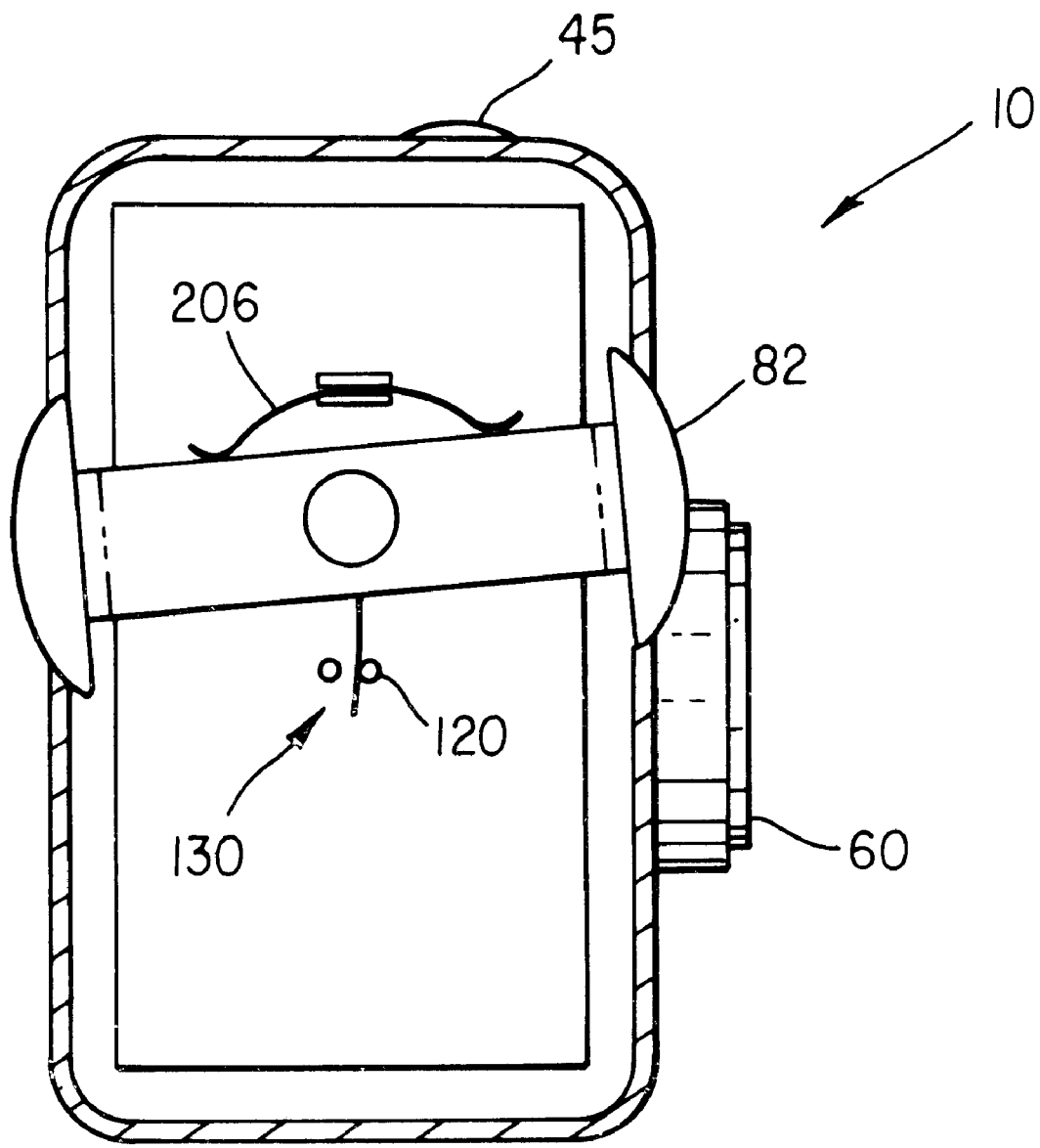
FIG. 17 is the same view is FIG. 15, but the lens movement control is in a second pivoted position.
Figure 18:
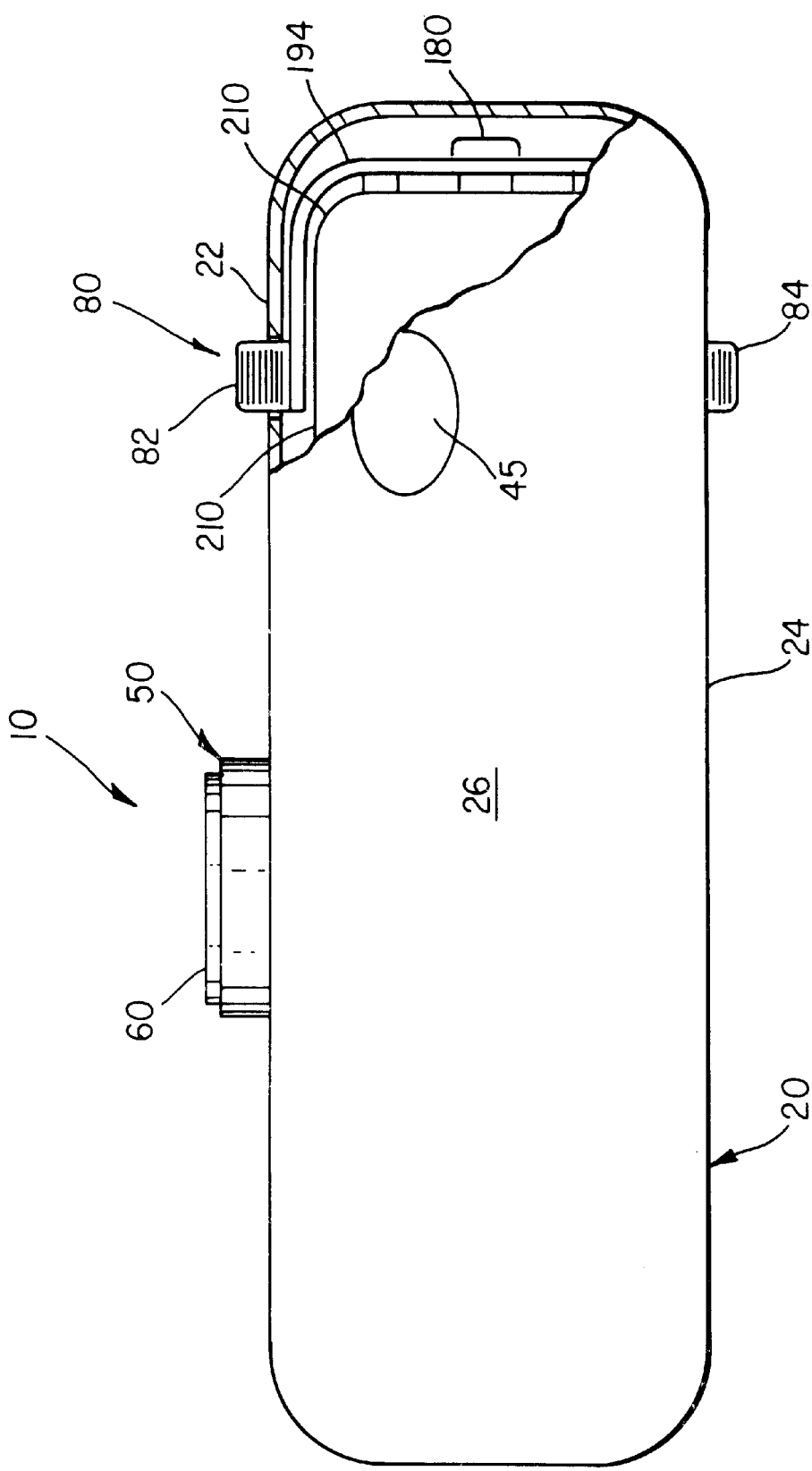
FIG. 18 is a top view of the camera of FIG. 15 partially cutaway to show the lens movement control.
Figure 19:
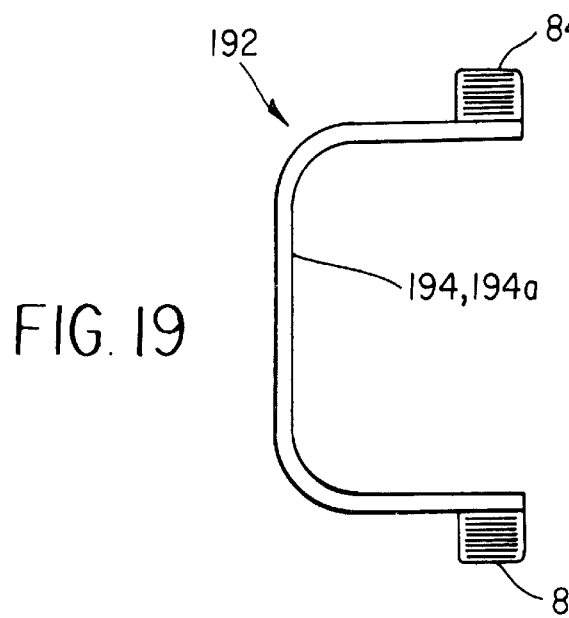
FIG. 19 is a top view of the yoke of the lens movement control shown in FIG. 18.
Figure 20:
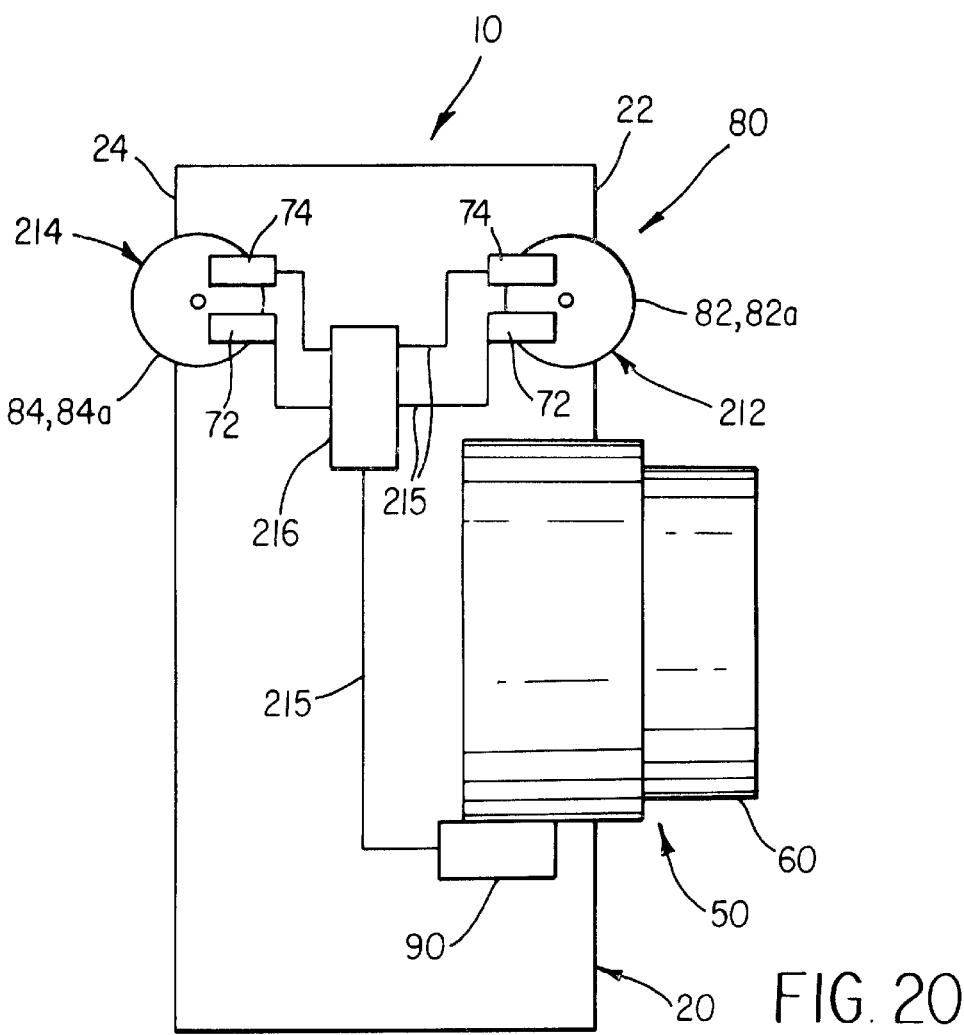
FIG. 20 is a diagrammatical view of another embodiment of the camera.

FIG. 14 illustrates a modification of the camera of FIGS. 11–13, in which a top grip surface 172 is also present on the yoke 192. The top grip surface 172 is adjacent to the top face 26 of the body 20 and, as shown, extends through an opening in the top face 26. An alternative or additional bottom grip surface 174 can be provided in the same manner. The provision of one or both of top and bottom grip surfaces on the yoke is not currently preferred, since these grip surfaces are harder to use than the front and rear grip surfaces, while maintaining a finger in contact with the shutter release. There is also the factor that the yoke 192 is not intended to act as a grip for the camera. It is intended that the user grip the main module. If only front and rear grip surfaces are used, then most of the end of the main module is available for the user to hold without interfering with the movement of the yoke 192.

Referring now to FIGS. 11–12 and 15–17, the yoke 192 can be reduced in size to a pair of ring segments 204 and a strut 202 connecting the segments 204. Each segment 204 includes a respective grip surface 82, 84. In this embodiment, the switch earlier described can be modified by the use of a leaf spring 206 held by a support 208 on the chassis 210 of the main module 20. The spring 206 presses on the strut 202 and biases the yoke 192 toward the neutral position.

Referring now to FIGS. 11–12 and 18–19, the shape of the connecting portion 194 of the yoke 192 is not critical and can be modified to meet the requirements of a particular use. In the embodiment shown in FIGS. 18–19, the chassis 210 and/or one or more other components of the main module 20 occupy the space directly between the front and rear grip surfaces 82, 84. To accommodate this, the connecting portion 194a of the yoke 192 is in the form of a U-shaped band that bridges between the front and rear grip surfaces 82, 84 and around the interfering components. The pivot detectors, such as the earlier described switch, can be accommodated at the end of the chassis 210.

Referring generally to FIGS. 11–19, positioning of the grip surfaces can be varied as necessary to meet requirements of a particular camera. In some particular embodiments, the front and rear grip surfaces are spaced at the same radial separation from the pivot axis. The uniform radial separation of the grip surfaces from the pivot axis prevents a difference in leverage between the different grip surfaces. Such a difference in leverage presents a risk of distracting the user. In some particular embodiments, the front and rear grip surfaces are opposite each other so as to be diametrically opposed and the front and rear faces are likewise opposed and roughly parallel. These features simplify the required shape for the yoke.

It is highly preferred that the shutter release 45 is mounted to the main module 20 in alignment with the grip surfaces 82, 84. "Alignment" here refers to the characteristic of being capable of being contacted by the fingers of a single hand of the photographer. With the embodiments illustrated, alignment also refers to a partial or complete overlap of relative positions along the camera's longitudinal axis. This can be varied, but excessive misalignment is uncomfortable for the user or, at the worst, impractical for use.

Referring now to FIGS. 11–12 and 20–22, in a particular embodiment, the camera has independently pivotable front and rear grip surfaces 82a, 84a. Each of the grip surfaces 82a, 84a is part of a respective front or rear grip element 212, 214 that is mounted to the body 20 and movable relative to the body 20 by manipulation of the exposed grip surface 82a, 84a, respectively. Pivot detectors 72, 74 are operatively connected to each of the grip elements 212, 214, so as to detect movement of the respective grip surface 82a, 84a in either direction of rotation. The type of pivot detector 72, 74 used is not critical and two pair of the pivot detectors earlier described for detecting movement of the yoke 192 can be used. The pivot detectors 72, 74 are each operatively connected to a controller 216, which is operatively connected to a driver 90, all by signal paths 215. The other features are as earlier described.

The controller can be a microcomputer or microprocessor having appropriate software or can be a circuit providing like functions with discrete components. The functions provided, as discussed below can be limited to that of a simple logic gate arrangement, or the equivalent, or can be more complex, if desired. The controller can move the lens elements in response to movement of either of the grip surfaces by itself or in response to a combination of movements of the two grip surfaces. The logic used to determine movement of the movable lens elements in response to combinations of movements of the two grip surfaces can be varied and is not limited to mimicking the action the above-discussed one-piece yoke. Discussion here is primarily directed to focusing or to optical zoom. It will be understood that digital zoom can be provided additionally or alternatively to optical zoom.

TABLE 1

|  | Rear detector in neutral state | Rear detector in state 1 | Rear detector in state 2 |
| --- | --- | --- | --- |
| Front detector in neutral state | Retain in position | Extend | Refract |
| Front detector in state 1 | Extend | Extend | Retain in position |
| Front detector in state 2 | Retract | Retain in position | Refract |

Figure 21:
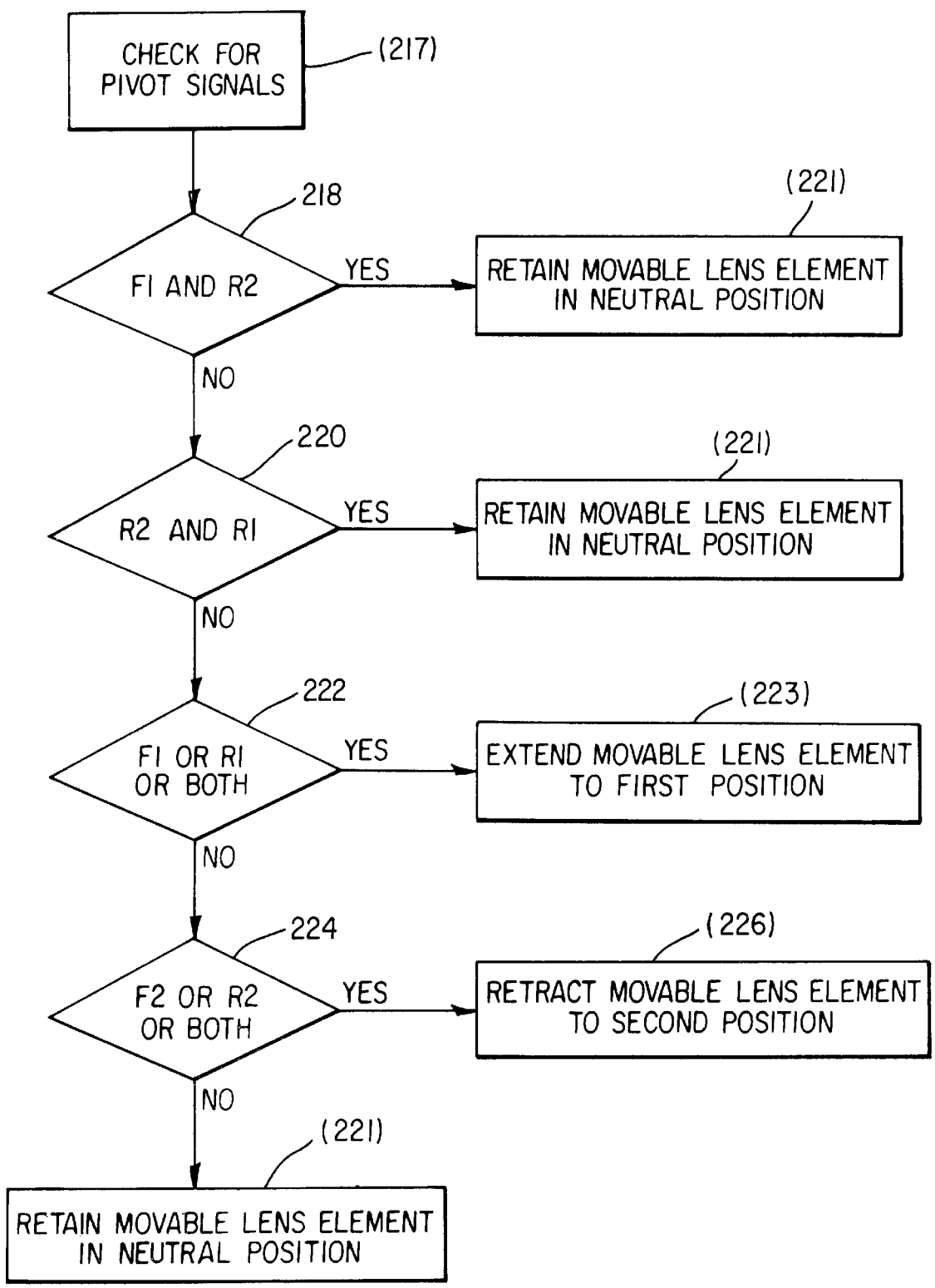
FIG. 21 is a flow chart of use of the lens movement control in an embodiment of the camera of FIG. 20.

FIG. 21 and Table 1 illustrate an example of a simple approach. In this embodiment, each of the pivot detectors can only signal three states: state 1 or pivoting in the first direction, state 2 or pivoting in the second direction, and a non-pivoted or neutral state. (In FIG. 21, the first state is indicated by "F1" for the front detector and "R1" for the rear detector and the second state is indicated by "F2" for the front detector and "R2" for the rear detector.) In this approach, the controller first checks (217) for pivot, signals. The controller can then access a look-up table, input detector signals, and assign actions as indicated in Table 1. The same results can also be obtained by use of a sequence of logic gates as shown in FIG. 21. The signals are checked against an AND gate 218 for F1 and R2 and then an AND gate 220 for F2 and R1. In both cases, an affirmative response causes the movable lens element to be retained (221) in neutral position. The signal is then checked by an OR gate 222 for F1 or R1 and then an OR gate 224 for F2 or R2. An affirmative response provides an extension (223) or retraction (226) of the movable lens element, respectively. A negative response for all of the gates, indicates no signal for both front and rear detectors, causes the movable lens element to be retained (221) in neutral position.

Figure 22:
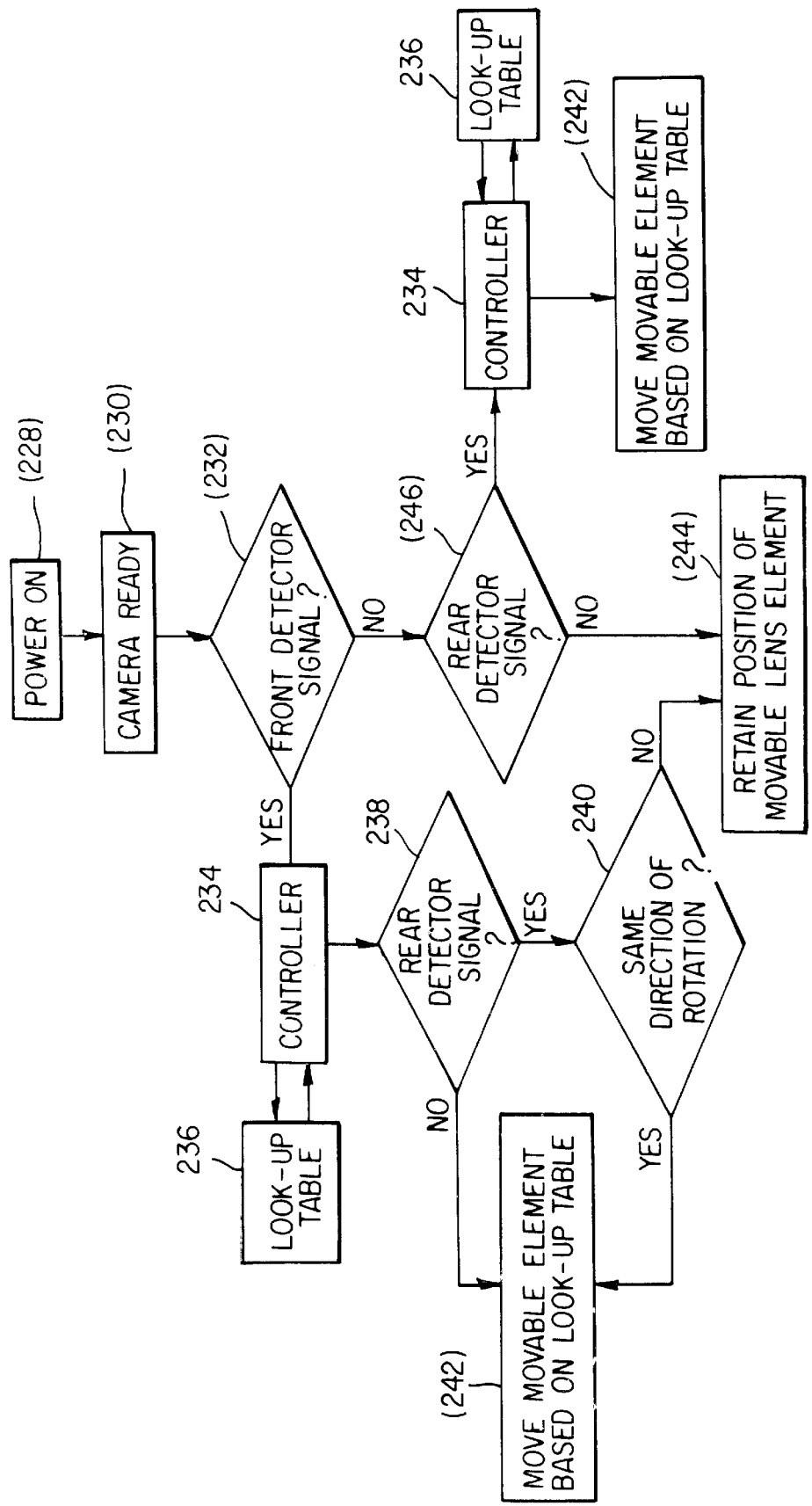
FIG. 22 is a flow chart of use of the lens movement control in a modification of the camera of FIG. 20.

FIG. 22 illustrates an alternative embodiment in which the signal from the front detector is used unless countermanded by the signal from the rear detector. In that method, power is initiated (228) and the camera is made ready (230) for image capture. A determination (232) is made whether either of the two front pivot detectors 72, 74 has signaled a rotation. If a rotation is found, then the controller 234 accesses a look-up table 236 and determines the corresponding input to be sent to the driver to provide a proportionate response in the corresponding direction for the movable lens unit. The controller 234 then checks (238) whether either of the two rear pivot detectors 72, 74 has signaled a rotation and, if so, checks (240) the direction of rotation indicated by that signal. If there is no signal from the rear detector, then the input to the driver moves (242) the movable lens unit in accordance with the look-up table value, that is proportionate to and in the direction indicated by the signal from the front detector. If there is a signal from the rear detector and the signal is in the same direction of pivoting as the front detector, the same thing is done as in the case of no signal from the rear detector. If the signal from the rear detector indicates a direction of rotation opposite that provided by the signal from the front detector, then the movable lens element is retained (244) in place without movement. If the front detector indicates that if there is no pivoting of the front grip element, as indicated by the absence of a signal from the front detector, then the presence or absent of a signal from the rear pivot detectors is checked (246) and the used by the controller 234 to access the look-up table 236 and determines an input to the driver for a proportionate response (242) in the corresponding direction. If there is no signal from either front or rear detectors, then the movable lens element is retained (244) in place.

In the embodiment just described, the signal from the front detector is given precedence over the signal from the rear detector. The camera can be modified to give the signal from the rear detector predominance. Alternatively, extent of motion of the movable lens element can be determined by the extent of motion of one of the grip surfaces that is moved more than the other. As another alternative, signals from a both front and rear detectors can be fed by the controller into a look up table to provide a response to that relies upon both signals in some combination, such as an average of the two signals or a difference signal. Similar effects can be provided if there are more than two grip surfaces, however, this is expected to be confusing to the user and is not preferred.

The invention has been described in detail with particular reference to certain preferred embodiments thereof; but it will be understood that variations and modifications can be effected within the spirit and scope of the invention.

What is claimed is:

1. A camera comprising:
   a main module having a front face and a rear face;
   a lens movement control having opposed front and rear grip surfaces disposed adjacent said front and rear faces, respectively, said grip surfaces being pivotable relative to said main module from a neutral position to opposed first and second pivoted positions; and
   a lens system joined to said main module, said lens system having a driver and a movable lens element connected to said driver, said driver extending and retracting said movable lens element, relative to said main module, during said pivoting of said lens movement control to said first and second pivoted positions, respectively.

2. The camera of claim 1 wherein said main module has an opening in each of said faces and said grip surfaces extend through respective said openings.

3. The camera of claim 2 wherein said lens movement control has a one piece yoke, said yoke including said grip surfaces, said yoke having a connecting portion disposed internal to said main module.

4. The camera of claim 1 wherein said lens movement control has a one piece yoke, said yoke including said grip surfaces, said yoke having a connecting portion disposed internal to said main module.

5. The camera of claim 4 wherein said main module has a component disposed directly between said grip surfaces and said connecting portion bridges between said grip surfaces around said component.

6. The camera of claim 5 wherein said grip surfaces each have the same radial separation from said pivot axis.

7. The camera of claim 4 further comprising a shutter release mounted to said main module in alignment with said grip surfaces, said shutter release being spaced from said yoke.

8. The camera of claim 1 wherein said front and rear grip surfaces are diametrically opposed relative to a pivot axis defined by said grip surfaces.

9. The camera of claim 1 wherein said main module has a top face extending between said front and rear faces and said lens movement control has a top grip surface disposed adjacent said top face.

10. The camera of claim 1 wherein said lens movement control includes a handle externally articulated to said main module.

11. The camera of claim 1 wherein said front and rear grip surfaces are independently pivotable.

12. The camera of claim 11 wherein said lens movement control has front and rear pivot detectors operatively connected to said front and rear grip surfaces, respectively; and said camera further comprises a controller operatively connected to said detectors and said driver.

13. The camera of claim 12 wherein said controller actuates said extending of said movable lens element responsive to said pivoting when both of said grip surfaces are pivoted to respective said first positions, and said controller actuates said retracting of said movable lens element responsive to said pivoting when both of said grip surfaces are pivoted to respective said second positions.

14. The camera of claim 13 wherein said controller actuates retention of said movable lens element in said neutral position responsive to said pivoting when said grip surfaces are pivoted in opposite directions.

15. A camera comprising:
   a main module having a front face and a rear face;
   a lens movement control having opposed front and rear grip surfaces disposed adjacent said front and rear faces, respectively, said grip surfaces each independently pivoting relative to said main module from a neutral position to opposed first and second pivoted positions, said lens movement control having front and rear pivot detectors operatively connected to said front and rear grip surfaces, respectively; and
   a lens system joined to said main module, said lens system having a driver and a movable lens element connected to said driver, said driver being capable of extending and retracting said movable lens element, relative to said main module; and
   a controller operatively connected to said detectors and said driver, said controller actuating said extending of said movable lens element responsive to said pivoting when both of said grip surfaces are pivoted to respective said first positions, and said controller actuating said retracting of said movable lens element responsive to said pivoting when both of said grip surfaces are pivoted to respective said second positions, said controller actuating retaining of said movable lens element in said neutral position responsive to said pivoting when said grip surfaces are pivoted in opposite directions.

16. A camera comprising:
   a main module having a front face and a rear face;
   a control module articulated to said main module, said control module pivoting relative to said main module from a neutral position to forward and rearward pivoted positions, said control module having opposed front and rear grip surfaces adjacent said front and rear faces, respectively; and
   a lens system joined to said main module, said lens system having a driver and a movable element connected to said driver, said driver being operatively connected to said control module wherein said driver extends and retracts said movable element, relative to said main module, during said pivoting of said control module to said forward and rearward pivoted positions, respectively.

17. The camera of claim 16 further comprising a shutter release mounted on said control module.

18. The camera of claim 16 further comprising a viewfinder mounted on said main module.

19. The camera of claim 16 wherein said lens system defines an optical axis and said pivoting is about a longitudinal axis perpendicular to said optical axis.

20. The camera of claim 19 wherein said control module has first and second dimensions perpendicular to said longitudinal axis, said first dimension being in a direction parallel to said optical axis, and at least one of said first and second dimensions is at least as large as a corresponding dimension of said body.

21. The camera of claim 19 wherein said control module has first and second dimensions perpendicular to said longitudinal axis, said first dimension being in a direction parallel to said optical axis, and said first and second dimensions are each the same size as a corresponding dimension of said body.

22. The camera of claim 16 further comprising a shutter release disposed between said front and rear grip surfaces.

23. The camera of claim 16 wherein said control portion partially enshrouds said body.

24. The camera of claim 16 wherein said driver extends and retracts said movable element, relative to said main module, between a plurality of different positions, said lens system having different focal lengths when said movable element is in said different positions.

25. The camera of claim 16 wherein said driver extends and retracts said movable element, relative to said main module, between a plurality of different positions, said lens system having different focused distances when said movable element is in said different positions.

26. A camera comprising:

a main module;

a control module articulated to said main module, said control module pivoting relative to said main module from a neutral position to forward and rearward pivoted positions;

a lens system joined to said main module, said lens system having a driver and a movable element connected to said driver, said driver being operatively connected to said control module wherein said driver is actuated to extend and retract said movable element during said pivoting of said control module to said forward and rearward pivoted positions, respectively; and a shutter release mounted on said control module.

27. The camera of claim 26 wherein said main module has opposed front and rear faces and said control module has opposed front and rear grip surfaces, and said front face and front grip surface being aligned and said rear face and rear grip surface being aligned when said control module is in said neutral position, said front face and front grip surface being misaligned and said rear face and rear grip surface being misaligned when said control module is in one of said pivoted positions.

28. The camera of claim 27 wherein said main module and said control module each have a top surface and a bottom surface, said top surfaces being aligned and said bottom surfaces being aligned when said control module is in said neutral position, said top surfaces being misaligned and said bottom surfaces being misaligned when said control module is in one of said pivoted positions.

29. The camera of claim 26 wherein said lens unit defines an optical axis and said pivoting of said control module is about a longitudinal axis perpendicular to said optical axis.

30. The camera of claim 26 further comprising a viewfinder mounted on said main module.

31. An articulated camera comprising:

a main module;

a lens unit mounted to said main module, said lens unit having a movable element movable between a retracted position and an extended position;

a driver mounted to said main module, said driver being actuable in a first state to drive said movable element toward said extended position and in a second state to drive said movable element toward said retracted position;

a control module pivotably mounted to said main module, said control module being operatively connected to said driver wherein pivoting said control module in a first rotational direction actuates said driver in said first state and pivoting said control module in a second rotational direction actuates said driver in said second state; and a shutter release mounted on said control module.

32. The camera of claim 31 wherein said main module has a front face and a rear face and said control module has opposed front and rear grip surfaces disposed adjacent said front and rear faces, respectively.

33. The camera of claim 31 further comprising a shutter release disposed between said front and rear grip surfaces.

34. The camera of claim 31 further comprising a viewfinder mounted to said main module.

* * * * *